July 21, 1970   R. HÖRNLEIN ET AL   3,521,341
METHOD OF ASSEMBLING AND FORMING AN EXTENSIBLE COLUMN
Filed June 17, 1968   4 Sheets-Sheet 3
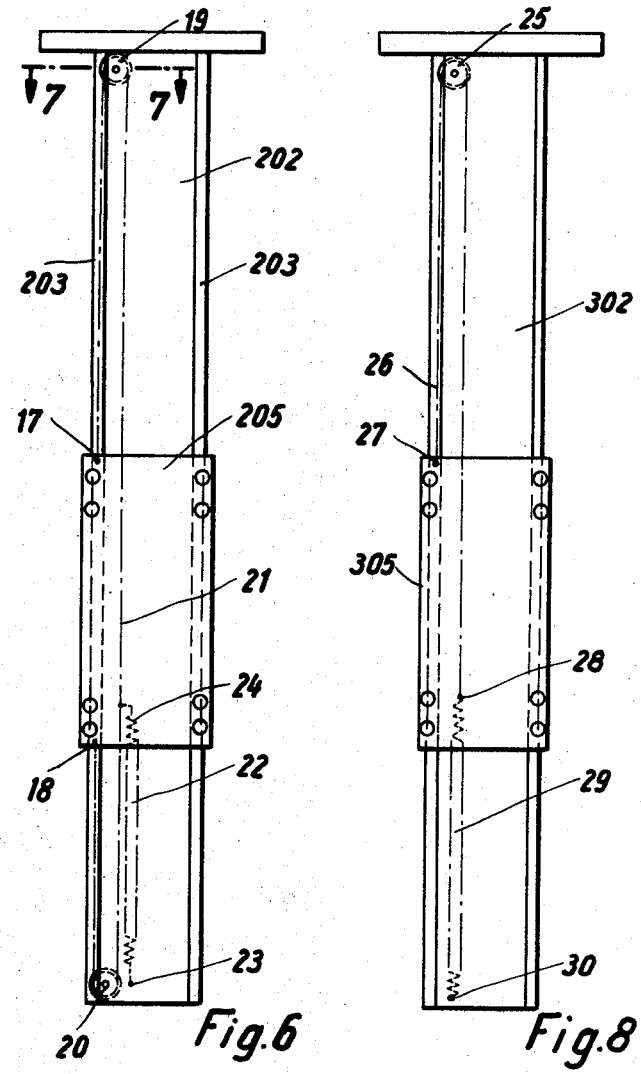
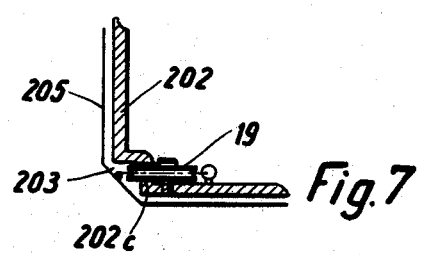
Inventor:
REINHARD HÖRNLEIN
OTTO TACKE
BY Michael S. Striker
ATTORNEY

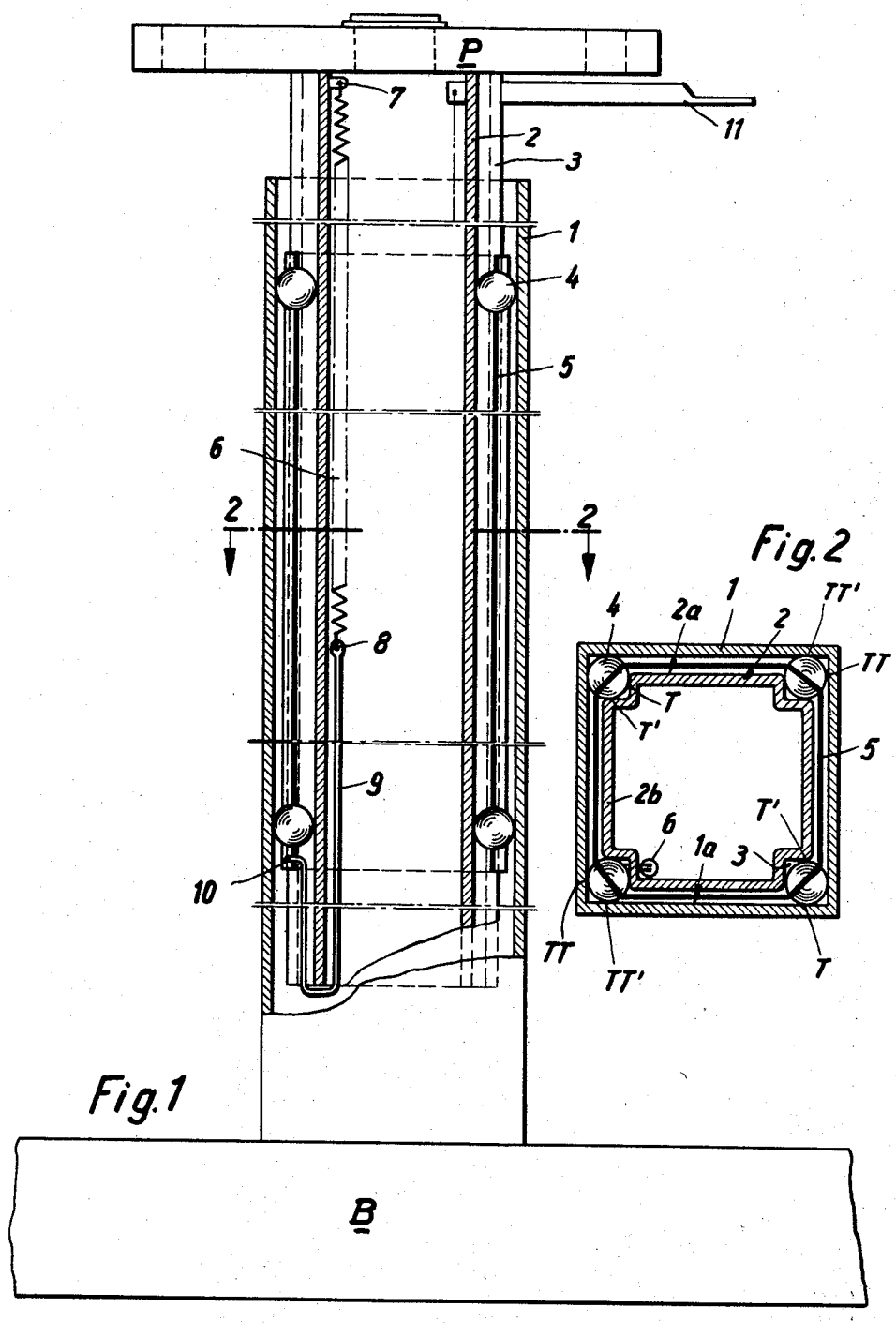

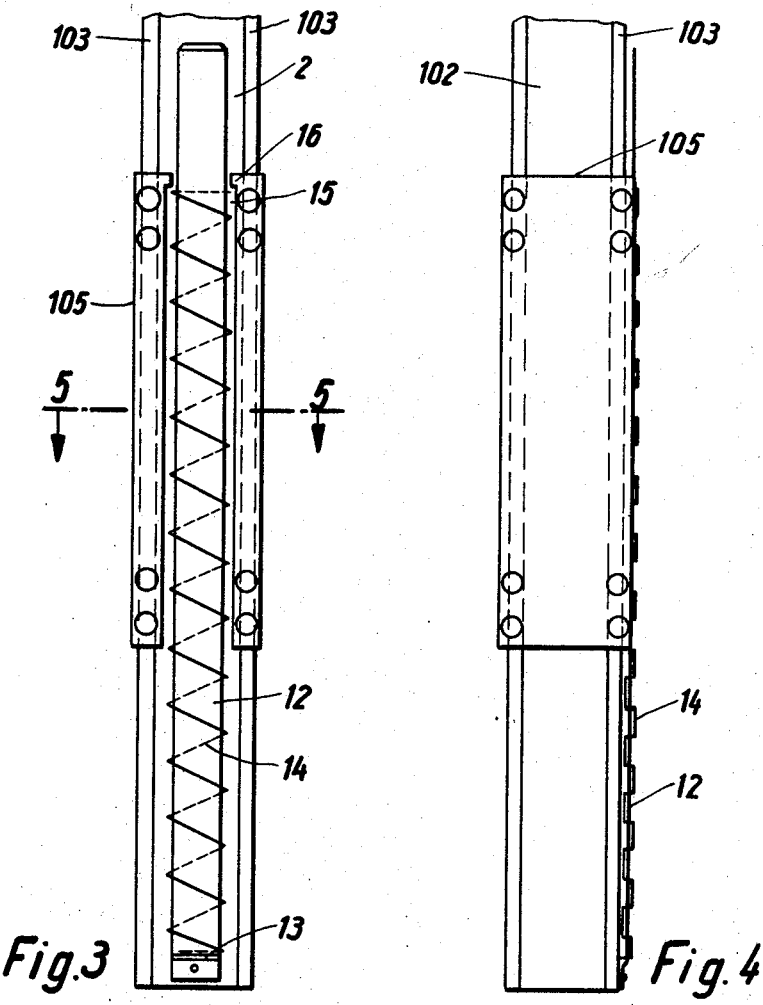
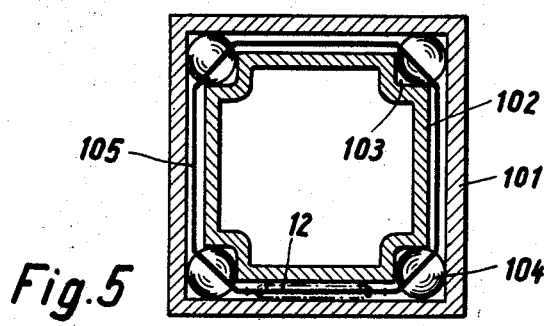

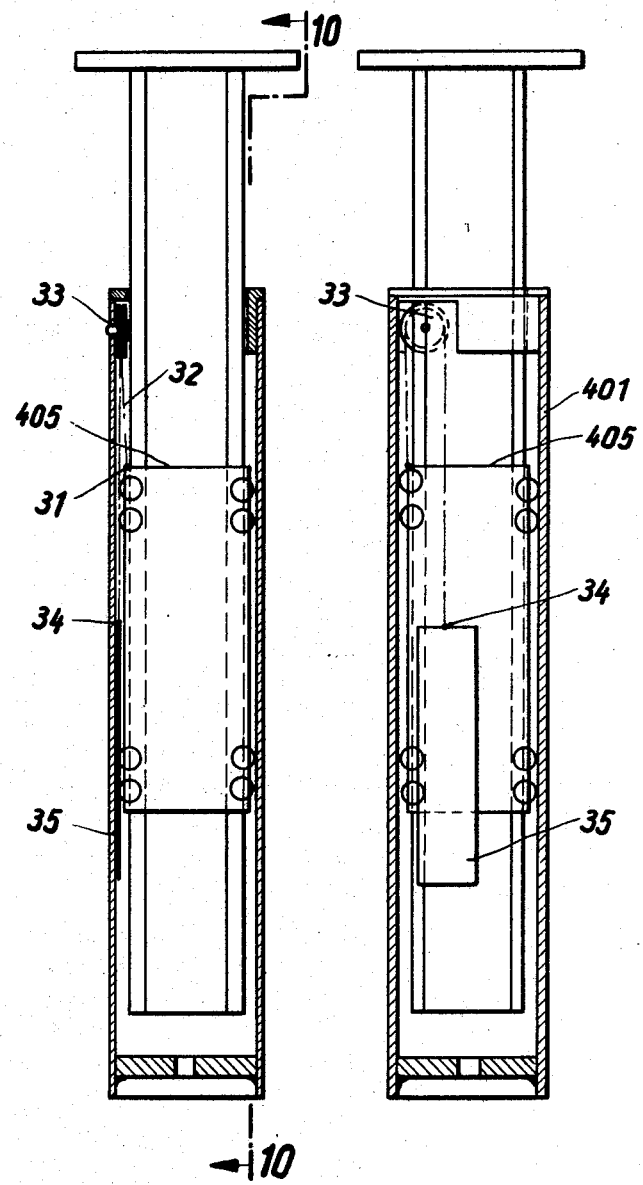

United States Patent Office 3,521,341
Patented July 21, 1970

3,521,341
METHOD OF ASSEMBLING AND FORMING AN
EXTENSIBLE COLUMN
Reinhard Hörnlein and Otto Tacke, Holzminden, Germany, assignors to Reinhard Hornlein KG., Holzminden, Germany
Filed June 17, 1968, Ser. No. 737,733
Int. Cl. B23p 11/00
U.S. Cl. 29—148.4      7 Claims

ABSTRACT OF THE DISCLOSURE

A method of assembling an extensible column wherein the corner zones of a rectangular inner tube which is telescoped into a rectangular outer tube are provided with longitudinally extending grooves for rows of balls which are mounted in a cage of rectangular outline. The cage is coupled to one of the tubes by way of one or more springs, cables, weights or the like so that it is held against uncontrolled downward movement in response to reciprocation of the tubes with reference to each other. These portions of surfaces of the tubes which engage the balls are provided with tracks which are formed by oversized spheres inserted between the tubes prior to introduction of balls and serving to penetrate into and to condense the material of tubes in response to repeated reciprocation of one tube with reference to the other tube.

BACKGROUND OF THE INVENTION

The present invention relates to a method of assembling and forming extensible and contractible columns of the type wherein an inner structural member is telescoped into and is movable lengthwise of a tubular outer structural member. Such columns may be utilized as legs for tables, chairs, desks and/or the like.

It is already known to assemble an extensible column of two polygonal tubes one of which is telescoped into the other and to place rows of balls between the tubes so that each ball remains in two-point contact with each of the tubes. The rows of balls are normally installed at the corners of the tubes. A drawback of presently known columns is that, in order to insure smooth and wobble-free movements of the tubes with reference to each other, all parts of the column must be machined and finished with a high degree of precision. As a rule, the corner portions of the external surface on the inner tube must be provided with grooves which accommodate portions of the balls. It was further noted that the cage for the balls invariably tends to travel downwardly when the column is mounted in upright position and when the inner tube is repeatedly caused to move up and down with reference to the outer tube or vice versa.

SUMMARY OF THE INVENTION

It is an object of the present invention to provide a novel and improved method of making an extensible column wherein two tubes or like structural members are telescoped into each other and to construct and assemble the column in such a way that the friction-reducing elements between the structural members are invariably held in an optimum position irrespective of the frequency and length of reciprocatory movements of the structural members with reference to each other.

Another object of the invention is to provide a method of preparing the structural members of the column for introduction of friction reducing elements therebetween.

A further object of the invention is to provide a method of making a column wherein all of the friction reducing reducing elements are stresses and wear away to the same extent and wherein those portions of the structural members which come in contact with the friction reducing elements are pretreated in a novel, simple and time-saving way.

A concomitant object of the invention is to provide a novel method for locating the friction reducing elements between the inner and outer members of the improved column.

An ancillary object of the invention is to provide a method of making a column which can support heavy loads and wherein the inner structural member is movable with reference to the outer structural member and/or vice versa without any clearance or with a predetermined amount of play.

Another object of the invention is to provide a method of making a column wherein a predetermined clearance between the structural members can be achieved even if the structural members are not machined with a high degree of precision.

The method of our invention is employed to form tracks for rows of antifriction rolling elements of predetermined dimensions in facing external and internal surfaces of telescopically assembled inner and outer structural members, especially in the internal surface of a rectangular outer tube and in grooves provided at the corners of the external surface on an inner tube which is fitted into and can move lengthwise of the outer tube or vice versa. The method comprises the steps of inserting between the two surfaces rows of oversized rolling elements whose dimensions exceed the dimensions of antifriction rolling elements, repeatedly moving at least one of the structural members lengthwise with reference to the other member so that the oversized rolling elements impress tracks into the adjoining portions of surfaces on both structural members, and removing the oversized rolling elements to provide room for insertion of a cage with antifriction rolling elements. The rolling elements are preferably spheres.

The novel features which are considered as characteristic of the invention are set forth in particular in the appended claims. The improved column itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a column which embodies one form of our invention, portions of the two structural members being shown in vertical section;

FIG. 2 is a horizontal sectional view as seen in the direction of arrows from the line II—II of FIG. 1;

FIG. 3 is a side elevational view of the inner structural member and of the cage in a modified column;

FIG. 4 is a view as seen from the left-hand side of FIG. 3;

FIG. 5 is a larger-scale horizontal sectional view of a column which embodies the structure of FIGS. 3 and 4, substantially as seen in the direction of arrows from the line V—V of FIG. 3;

FIG. 6 is a side elevational view of the inner tube and cage in a third column;

FIG. 7 is a larger scale fragmentary horizontal sectional view as seen in the direction of arrows from the line VII—VII of FIG. 6;

FIG. 8 is a side elevational view of the inner tube and cage in a fourth column;

FIG. 9 is a fragmentary partly elevational and partly sectional view of a further column; and FIG. 10 is a view as seen in the direction of arrows from the line X—X of FIG. 9.

DESCRIPTION OF THE PREFERRED EMBODIMENTS

Referring first to FIGS. 1 and 2, there is shown an extensible and contractible upright column which comprises a tubular outer structural member 1 of rectangular outline and an inner tubular structural member 2 of rectangular outline. These members will be called tubes for short. The four corners of the inner tube 2 are provided with longitudinally extending grooves 3 for rows of spherical antifriction rolling elements 4 which are held in a cage 5 of rectangular outline. Each rolling element 4 is in two-point contact with the internal surface 1a of the outer tube 1 and in two-point contact with the external surface 2a of the inner tube 2. It will be noted that the rolling elements 4 contact the surface 2a at points which are adjacent to the outer ends of the respective grooves 3, namely, in regions where the walls 2b of the inner tube 2 offer a considerable resistance to pressure transmitted to the surface 2a by the rolling elements 4.

The surfaces 2a and 1a are provided with longitudinally extending shallow tracks T, T' and TT, TT' into which the rolling elements 4 extend and wherein such rolling elements make contact with the respective surfaces. The tracks are formed by oversized metallic rolling elements (not shown) which are introduced between the tubes 1, 2 prior to introduction of the cage 5, and the tube 1 is then caused to move repeatedly lengthwise of the tube 2 and/or vice versa so as to complete a predetermined number of strokes and to condense the material of the tubes along those portions of surfaces 1a, 2a which come in contact with oversized rolling elements. The diameters of all oversized rolling elements are the same so that the curvature of surfaces bounding the tracks T, T', TT, TT' which are formed in the surfaces 1a and 2a is the same. The oversized rolling elements are then removed to provide room for thec age 5 and its antifriction rolling elements 4. The provision of tracks in the surfaces 1a, 2a insures that the friction between each rolling element 4 and the tubes 1, 2 is the same, i.e., each rolling element 4 is stressed and wears away to the same extent and the tube 2 can be readily moved lengthwise of the tube 1 or vice versa.

In the column of FIGS. 1 and 2, the cage 5 is held against lengthwise displacement with reference to the inner tube 2 by a locating device including a helical spring 6 which is accommodated in the interior of the inner tube. The upper end convolution of the spring 6 is attached to the tube 2, as at 7, and its lower end is affixed to an eye 8 provided at the upper end of a connector 9 consisting of wire or the like and coupled to the lower end portion 10 of the cage 5. A median portion of the connector 9 extends around the lower end of the inner tube 2. When the latter moves upwardly, the spring 6 shares its movement and entrains the connector 9 which lifts the cage 5 and rolling elements 4. The bias of the spring 6 is such that it can oppose the weight of the cage 5 and rolling elements 4.

It is also possible to omit the connector 9 and to connect the lower end of the spring 6 directly to the upper end portion of the cage 5. A drawback of such a locating device is that the spring is then visible at the outer side of the inner tube 2 when the column is extended; it is normally placed into one of the grooves 3. It is further possible to suspend the cage 5 on the outer tube 1 by way of one or more resilient elements.

The interior of the inner tube 2 preferably further accommodates a lifting and lowering mechanism (not shown) which can be actuated by a lever 11. For example, the lifting mechanism may include one or more conventional hydraulic, pneumatic or hydraulic-pneumatic cylinder and piston assemblies. The top of the tube 2 carries a platform P and the bottom end of the tube 1 is connected with a base B.

An important advantage of the aforedescribed method of providing the surfaces 1a and 2a with tracks T, T', TT, TT' for the antifriction rolling elements 4 is that the inner tube 2 can be mounted in the outer tube 1 without any clearance or with a desired amount of play even if the one and/or the other tube is not machined or otherwise finished with a high degree of precision. The dimensions of serially produced inner and outer tubes vary within a certain range but this does not affect the operation of assembled columns because the oversized balls impress in the surfaces 1a, 2a tracks which are deeper or shallower, depending on the deviation of the dimensions of tubes 1 and 2 from a predetermined norm. The material of oversized balls is sufficiently hard to deform the material of the tubes and to form in the surfaces 1a and 2a tracks which are exactly right for the rows of rolling elements 4. As a rule, the rolling elements 4 can be produced and finished with a much higher degree of precision than the tubes 1 and 2.

The oversized balls are preferably mounted in a cage so that they can be inserted and removed as a unit.

It often suffices to provide the cage 5 with two rows of rolling elements 4 which then extend into a pair of grooves 3 located diametrically opposite each other.

The extent to which the diameters of oversized balls exceed the diameters of rolling elements 4 depends on the tolerances of tubes 1 and 2, on hardness of their material and on tolerances of rolling elements. As stated before, the tracks T, T' on the inner tube 2 are preferably formed in the regions of outer ends of the grooves 3 where the material surrounding the grooves offers a maximum resistance to deformation. In other words, the tracks T, T' face the ends of the respective walls 2b.

Uniform wear on all of the rolling elements 4 and equal friction between each element 4 and the surfaces 1a, 2a can be achieved by using oversized elements which constitute spheres or portions of spheres and wherein the curvature of all surfaces on the oversized elements which engage the surfaces 1a, 2a is the same.

FIGS. 3 to 5 show a modified upright column having tubes 101, 102, antifriction rolling elements 104 in grooves 103 and a cage 105 which is provided with a longitudinally extending slot 15 between a pair of adjoining grooves 103 in the inner tube 102. The slot 15 accommodates an elongated flat band or carrier 12 forming part of a modified locating device for the cage 105 and the lower end of which has a projection 13 serving as a stop for one end of a helical expansion spring which is convoluted around the carrier and the upper end of which bears against two inwardly extending lugs or stops 16 of the cage 105. The stops 16 are located at the upper end of the slot 15. The projection 13 is adjacent to the point where the carrier 12 is affixed to one of the tubes 101, 102.

The stops 16 can be omitted if the upper end of the spring 14 is coupled directly to the upper end portion of the cage 105. Furthermore, the carrier 12 can be replaced by a rod-like carrier. Furthermore, the spring 16 can be replaced by a resilient element which surrounds a portion of the inner tube 102 or by a resilient element installed in one of the grooves 103. The function of the spring 14 or of a substitute therefor is to bias the cage 105 upwardly and to thus counteract the natural tendency of the cage to travel downwardly in response to repeated reciprocation of the tube 102 with reference to the tube 101 or vice versa.

The tracks (not shown) are formed in the surfaces of tubes 101, 102 in the same way as described in connection with FIGS. 1 and 2. The tubes 1, 2 or 101, 102 are preferably square or rectangular but it is equally possible to employ tubes of other polygonal cross-sectional outline. The columns shown in FIGS. 1, 2 and 5 can be used as legs in chairs, tables, desks or other pieces of furniture.

In the upright column of FIGS. 6 and 7, the locating means for holding the cage 205 against excessive movement with reference to the inner tube 202 comprises a cable, cord, rope or a like flexible member 21 (hereinafter called cable) whose ends 17, 18 are attached to the upper and lower ends of the cage. The cable 21 is trained over pulleys 19, 20 which are rotatably supported by the upper and lower ends of the inner tube 202. As shown in FIG. 7, the pulleys 19, 20 can be mounted in the interior of the tube 202 and extend into the adjoining groove 203 through cutouts 202c provided in the inner tube.

A helical spring 22 which tends to contract is affixed to the lower end of the tube 202, as at 23, and to an intermediate portion 24 of the cable 21. Its function is to oppose the weight of the cage 205. It is clear that the spring 22 can be replaced by a different spring or by other biasing means, e.g., by a counterweight (not shown). An advantage of the solution shown in FIG. 6 is that the locating means for holding the cage 205 against uncontrolled displacement is accommodated almost entirely in the interior of the inner tube 202. Therefore, such locating means does not interfere with insertion of the inner tube 202 into the outer tube (not shown).

In the embodiment of FIG. 8, the inner tube 302 carries a single pulley 25 for a cable 26 one end 27 of which is connected to the upper end portion of the cage 305. The other end 28 of the cable 26 is connected to the upper end of a helical spring 29 having its lower end 30 connected to the lower end portion of the tube 302. The spring 29 can be replaced by a different biasing means, e.g., by a leaf spring, a torsion spring or a counterweight. The locating device 25, 26, 29 of FIG. 8 comprises fewer parts than the locating device of FIGS. 6 and 7.

The upright column of FIGS. 9 and 10 comprises a cage 405 the upper end of which is connected to one end 31 of a cable 32 trained over a pulley 33 which is mounted in the outer tube 401 at a level above the end 31. The other end 34 of the cable 32 carries a weight 35 which can be replaced by at flat rubber band (not shown) or other suitable biasing means.

It will be seen that the cage for the rolling elements can be suspended on the inner tube (FIGS. 1-8) or on the outer tube (FIGS. 9-10) of the column.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A method of forming tracks for rows of antifriction rolling elements of predetermined dimensions in external and internal surfaces of telescopically assembled inner and outer structural members, comprising the steps of introducing between said surfaces rows of oversized rolling elements whose dimensions exceed said predetermined dimensions; repeatedly moving at least one of the structural members with reference to and lengthwise of the other structural member so that the oversized rolling elements impress tracks into said surfaces; and removing the oversized rolling elements to provide room for antifriction rolling elements.

2. A method as defined in claim 1, wherein all of said rolling elements are spheres.

3. A method as defined in claim 1, wherein said surfaces are of polygonal outline and the inner structural member has grooves extending lengthwise of the corners of said external surface, the tracks in said external surface being formed at the outer ends of said grooves.

4. A method as defined in claim 1, wherein each row of oversized rolling elements is arranged to form two tracks in each of said surfaces.

5. A method as defined in claim 1, further comprising the step of holding the oversized rolling elements in a cage during insertion between said surfaces.

6. A method as defined in claim 1, wherein the oversized rolling elements are spheres of identical diameters so that the curvature of surfaces bounding the tracks impressed into said external surface is identical with that of tracks formed in said internal surface.

7. A method as defined in claim 1, wherein the dimensions of said oversized rolling elements exceed the dimensions of said antifriction rolling elements by a value which is a function of tolerances and hardness of the material of the structural members.

References Cited

UNITED STATES PATENTS 2,719,765 10/1955 Menne.
2,783,528 3/1957 Menne.
3,248,831 5/1966 Jones _____ 52—121

THOMAS H. EAGER, Primary Examiner

U.S. Cl. X.R.

29—155, 434; 52—121; 248—161